United States Patent
Kobayashi et al.

(10) Patent No.: US 10,088,499 B2
(45) Date of Patent: Oct. 2, 2018

(54) SCANNING PROBE MICROSCOPE

(71) Applicant: Shimadzu Corporation, Kyoto (JP)

(72) Inventors: Kanji Kobayashi, Kyoto (JP); Masato Hirade, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 15/712,760

(22) Filed: Sep. 22, 2017

(65) Prior Publication Data

US 2018/0106832 A1 Apr. 19, 2018

(30) Foreign Application Priority Data

Oct. 19, 2016 (JP) .................................. 2016-005057

(51) Int. Cl.
*G01Q 30/02* (2010.01)
*G01Q 20/02* (2010.01)

(52) U.S. Cl.
CPC .......... *G01Q 30/025* (2013.01); *G01Q 20/02* (2013.01)

(58) Field of Classification Search
USPC .... 250/306, 307, 492.3, 442.11, 526; 850/1, 850/3, 5, 6, 18, 21, 63
See application file for complete search history.

(56) References Cited

U.S. PATENT DOCUMENTS

| | | | | |
|---|---|---|---|---|
| 5,581,082 A * | 12/1996 | Hansma | .................. | B82Y 35/00 250/307 |
| 5,675,154 A * | 10/1997 | Lindsay | .................. | B82Y 10/00 250/440.11 |
| 5,760,396 A * | 6/1998 | Lindsay | .................. | B82Y 10/00 250/440.11 |
| 6,674,074 B2 * | 1/2004 | Schwartz | ............... | B82Y 35/00 250/442.11 |
| 6,737,646 B2 * | 5/2004 | Schwartz | ............... | B82Y 35/00 250/492.3 |
| 7,179,536 B1 * | 2/2007 | Hosoe | ...................... | G02B 3/00 428/446 |
| 9,689,892 B2 * | 6/2017 | Hirade | .................. | G01Q 10/065 |
| 2017/0131324 A1 * | 5/2017 | Hirade | .................. | G01Q 10/065 |
| 2018/0008148 A1 * | 1/2018 | Hirade | .................. | A61B 5/0062 |
| 2018/0088148 A1 * | 3/2018 | Hirade | .................. | G01Q 10/04 |

FOREIGN PATENT DOCUMENTS

JP 4032272 B 1/2008

* cited by examiner

*Primary Examiner* — Bernard Souw
(74) *Attorney, Agent, or Firm* — Maier & Maier, PLLC

(57) ABSTRACT

Provided is a scanning probe microscope capable of performing observation with high accuracy even when a beam splitter is configured to be movable.

When checking positions of a sample and a cantilever in a scanning probe microscope, by disposing an optical microscope to face a first opening portion of a top surface of a housing, and by gripping and rotating an operating portion provided on a side surface of the housing, a user rotates and moves a beam splitter held by a holding portion in the housing, and retracts the beam splitter from the field of view of the optical microscope. Therefore, the beam splitter can always be disposed in the housing, and the user can be prevented from touching the beam splitter. As a result, it is possible to prevent the beam splitter from being damaged or stains from adhering to the beam splitter. Further, the moving distance of the bears splitter 6 can be shortened. Therefore, it is possible to suppress the occurrence of a deviation in the position of the beam splitter.

5 Claims, 4 Drawing Sheets

SCANNING PROBE MICROSCOPE

BACKGROUND OF THE INVENTION

Field of the Invention

The present invention relates to a scanning probe microscope having a mechanism which moves a beam splitter.

Description of the Related Art

From the related art, a scanning probe microscope has been used as an apparatus for inspecting a fine surface shape of a sample. In the scanning probe microscope, by relatively moving the probe to the surface of the sample and scanning the surface, a change in a physical quantity (such as a tunnel current or an atomic force) acting between the probe and the sample surface during the scanning is detected. Further, by feedback-controlling the relative position of the probe to constantly keep the physical quantity during scanning, the surface shape of the sample can be measured on the basis of the feedback amount.

As such a scanning probe microscope, an apparatus having an observation window for checking the positions of the sample and the probe is used. In the scanning probe microscope, an optical microscope is provided to face the observation window. Further, the positions of the sample and the probe are checked using the optical microscope, and positioning thereof is performed (see, for example, Japanese Patent No. 4032272).

In the scanning probe microscope described in Japanese Patent No. 4032272, when measuring the surface shape of the sample, after the laser beam emitted from the beam source is reflected by the beam splitter, the laser beam is reflected by the probe and the mirror and is received by the photodiode. Meanwhile, when the positions of the sample and the probe are checked using the optical microscope, the beam splitter is moved from the reflection position. Then, in the state in which the beam splitter is retracted from the optical path of the optical microscope, the positions of the sample and the probe are checked by the optical microscope. This makes it possible to improve the visibility when positioning the sample and the probe.

In the scanning probe microscope of the related art as described above, when the optical microscope is used, the beam splitter is moved so as to be extracted to the outside of the housing. Therefore, there is a possibility that the user touches the beam splitter. When the user touches the beam splitter, the beam splitter may be damaged or stains may adhere to the beam splitter. Further, since the moving distance of the beam splitter increases, there is a high possibility that the position of the beam splitter deviates. That is, in the scanning probe microscope of the related art, when the beam splitter is configured to be movable, the accuracy of observation may decrease.

SUMMARY OF THE INVENTION

An object of the invention is to provide a scanning probe microscope capable of performing observation with high accuracy even when the beam splitter is configured to be movable.

(1) A scanning probe microscope according to the invention includes a cantilever, a beam source, a beam receiving unit, a beam splitter, a housing, and a rotation mechanism. The cantilever is scanned along a surface of a sample. The beam source irradiates the cantilever with beam. The beam receiving unit receives reflected beam from the cantilever. The beam splitter is provided on an optical path from the beam source to the beam receiving unit to reflect beam passing through the optical path. The housing houses at least the cantilever and the beam splitter therein. The rotation mechanism retracts the beam splitter from the optical path inside the housing by rotationally moving the beam splitter. An opening portion is formed on a top surface of the housing, an optical microscope for observing the surface of the sample being disposed to face the opening portion. The beam splitter is disposed within the field of view of the optical microscope when located on the optical path, and retracts from the field of view of the optical microscope by being rotationally moved by the rotation mechanism to retract from the optical path. The rotation mechanism includes an operating portion. The operating portion is provided on a side surface other than the top surface of the housing, and is gripped by a user when rotationally moving the beam splitter.

According to such a configuration, when checking the positions of the sample and the cantilever, by disposing the optical microscope to face the opening portion of the top surface of the housing, and by gripping the operating portion provided on the side surface of the housing to perform a predetermined operation, the user rotates and moves the beam splitter by the rotation mechanism, and can retract the beam splitter from the field of view of the optical microscope. Further, since the operating portion is provided on the side surface of the housing, the operating portion does not interfere with the optical microscope. At this time, the beam splitter rotates and moves within the housing.

Therefore, even when the beam splitter is rotated and moved, the beam splitter can always be disposed in the housing, and the user can be prevented from touching the beam splitter.

As a result, it is possible to prevent the beam splitter from being damaged or stains from adhering to the beam splitter.

Further, since the beam splitter moves by rotational movement, the moving distance thereof can be shortened.

Therefore, it is possible to suppress the occurrence of a deviation in the position of the beam splitter.

In this way, with the scanning probe microscope according to the present invention, observation can be performed with high accuracy even when the beam splitter is configured to be movable.

(2) Further, the rotation mechanism may include a holding portion and a shaft portion. The holding portion holds the beam splitter. The shaft portion is connected to the holding portion. The holding portion connected to the shaft portion rotates and moves together with the beam splitter by rotation of the shaft portion based on operation of the operating portion.

According to such a configuration, it is possible to stably rotate and move the beam splitter connected to the operating portion via the shaft portion, on the basis of the operation of the operating portion by the user.

(3) In addition, the shaft portion may be connected to the holding portion such that an extension line thereof is eccentric to the center of the beam splitter.

According to such a configuration, when the shaft portion rotates on the basis of the operation of the operating portion by the user, the beam splitter rotates and moves largely.

Thus, the operation of the operating portion performed by the user to move the beam splitter can be set to a small motion.

(4) Further, an elastic member may be provided between the rotation mechanism and the side surface. The elastic member prevents rattling of the rotation mechanism.

With such a configuration, it is possible to suppress the occurrence of deviation in the position of the beam splitter due to rattling of the rotation mechanism.

(5) Further, the scanning probe microscope may further include a stopper. The stopper regulates a rotational position of the operating portion at each of an insertion position at which the beam splitter is located on the optical path and a retracted position at which the beam splitter is retracted from the optical path.

According to such a configuration, by regulating the rotational position of the operating portion by the stopper, the beam splitter can be reliably disposed at the insertion position or the retracted position.

According to the invention, the beam splitter rotates and moves within the housing. Therefore, it is possible to prevent the user from touching the beam splitter, and it is possible to prevent the beam splitter from being damaged or stains from adhering to the beam splitter. In addition, the moving distance of the beam splitter can be shortened. Therefore, it is possible to suppress the occurrence of deviation in the position of the beam splitter. That is, even when the beam splitter is configured to be movable, observation can be performed with high accuracy.

DETAILED DESCRIPTION OF THE INVENTION

1. Overall Configuration of Scanning Probe Microscope

Figure 1:
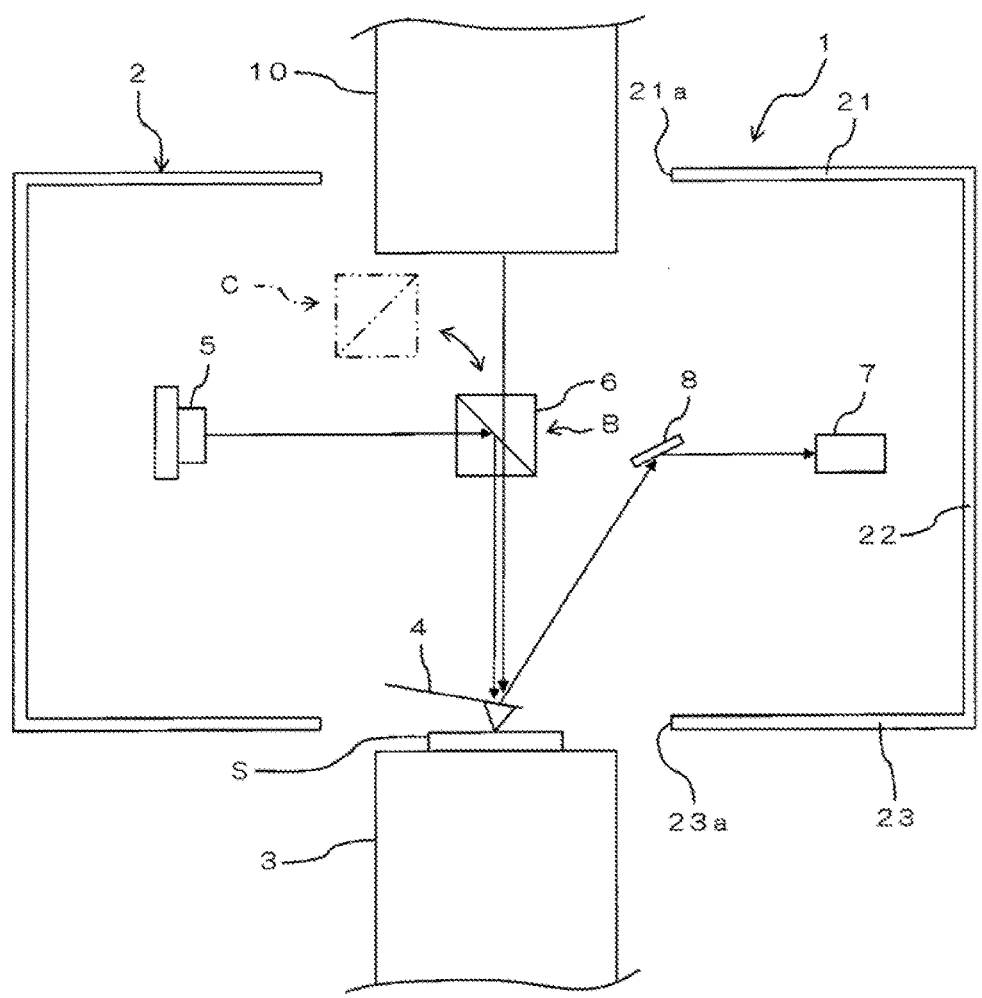
FIG. 1 is a cross-sectional view illustrating a configuration example of a scanning probe microscope according to an embodiment of the invention.

FIG. 1 is a cross-sectional view illustrating a configuration example of a scanning probe microscope 1 according to an embodiment of the invention. The scanning probe microscope 1 is, for example, an atomic force microscope (AFM). The scanning probe microscope 1 includes a housing 2, a stage 3, a cantilever 4, a beam source 5, a beam splitter 6, a beam receiving unit 7, and a mirror 8.

The housing 2 is formed in a hollow box shape. The housing 2 has a top surface 21, a side surface 22, and a bottom surface 23. On the top surface 21, a first opening portion 21a as an example of an opening port ion is formed. On the bottom surface 23, a second opening portion 23a is formed. The first opening portion 21a of the top surface 21 and the second opening portion 23a of the bottom surface 23 are disposed to face each other in the vertical direction. An optical microscope 10 is placed on the top surface 21. The optical microscope 10 is disposed to face the first opening portion 21a of the top surface 21.

The stage 3 is disposed below the housing 2. Specifically, the stage 3 is disposed below the second opening portion 23a of the bottom surface 23. The stage 3 is formed in a cylindrical shape extending in the vertical direction. A sample S is placed on the upper end surface of the stage 3. For example, a piezoelectric element (not illustrated) is attached to an outer peripheral surface of the stage 3. Further, by applying a voltage to the piezoelectric element, the stage 3 is appropriately deformed, and the position of the sample S on the stage 3 changes.

The cantilever 4 is disposed inside the housing 2, and specifically, the cantilever 4 is disposed in the vicinity of the second opening portion 23a of the bottom surface 23 of the housing 2. The cantilever 4 is, for example, an elongated member supported in a cantilever manner, and a probe is provided at a tip portion on a free end side. The cantilever 4 (the probe of the cantilever 4) is scanned along the surface of the sample S on the stage 3.

The beam source 5 is disposed inside the housing 2. The beam source 5 is configured to emit laser beam.

The beam splitter 6 is disposed inside the housing 2, and is usually disposed on the optical path of the beam source 5. As will be described in detail later, the beam splitter 6 is movable between an insertion position B disposed on the optical path of the beam source 5 and a retracted position C retracted from the optical path of the beam source 5. The insertion position 3 and the retracted position C are predetermined positions inside the housing 2. The beam splitter 6 reflects the beam from the beam source 5 toward the cantilever 4 in the state of being disposed at the insertion position B. At this time (when disposed at the insertion position B), the beam splitter 6 is disposed on the optical path from the beam source 5 and is disposed within the field of view of the optical microscope 10.

The beam receiving unit 7 is disposed, inside the housing 2. The beam receiving unit 7 is, for example, a photodiode or the like, and is configured to receive and detect the reflected beam from the cantilever 4.

The mirror 8 is disposed between the cantilever 4 and the beam receiving unit 7 inside the housing 2.

In the scanning probe microscope 1, when observing the sample S, the beam splitter 6 is disposed at the Insertion position B. Further, the stage 3 is appropriately deformed, and the position of the sample S on the stage 3 changes. As a result, the probe of the cantilever 4 is relatively moved with respect to the surface of the sample S and is scanned along the surface of the sample S. During the scanning, the atomic force acting between the probe and the surface of the sample S changes.

Further, laser beam is irradiated from the beam source 5. The beam from the beam source 5 is reflected by the beam splitter 6 and is directed toward the probe of the cantilever 4. Further, the beam (reflected beam) reflected by the probe of the cantilever 4 is reflected by the mirror 8 and received by the beam receiving unit 7.

Since the probe of the cantilever 4 is relatively moved along the unevenness of the surface of the sample S, the probe is bent according to the shape of the unevenness. When the probe of the cantilever 4 is bent, the position where the reflected beam is received changes in the beam receiving unit 7. Therefore, it is possible to detect a change in atomic force acting between the probe of the cantilever 4 and the surface of the sample S during the scanning, on the basis of the change in the beam receiving position of the reflected beam at the beam receiving unit 7. Further, the surface shape of the sample S is measured on the basis of the change in the atomic force.

On the other hand, when checking the positions of the sample S and the cantilever 4, the beam splitter 6 is disposed at the retracted position C. Further, the beam splitter 6 is retracted from the optical path of the beam source 5, and is retracted from the field of view of the optical microscope 10. In this state, the positions of the sample S and the cantilever 4 are checked, using the optical microscope 10, and positioning thereof is performed. At this time, the irradiation of the laser beam from the beam source 5 is stopped.

In this manner, in the scanning probe microscope 1, the beam splitter 6 is disposed at the insertion position B when observing the sample S. When checking the positions of the sample S and the cantilever 4, the beam splitter 6 is disposed at the retracted position C.

2. Configuration of Rotation Mechanism

As described above, the beam splitter 6 moves between the insertion position B and the retracted position C inside the housing 2. The movement of the beam splitter 6 is performed by the operation of the rotation mechanism 11.

Figure 2:
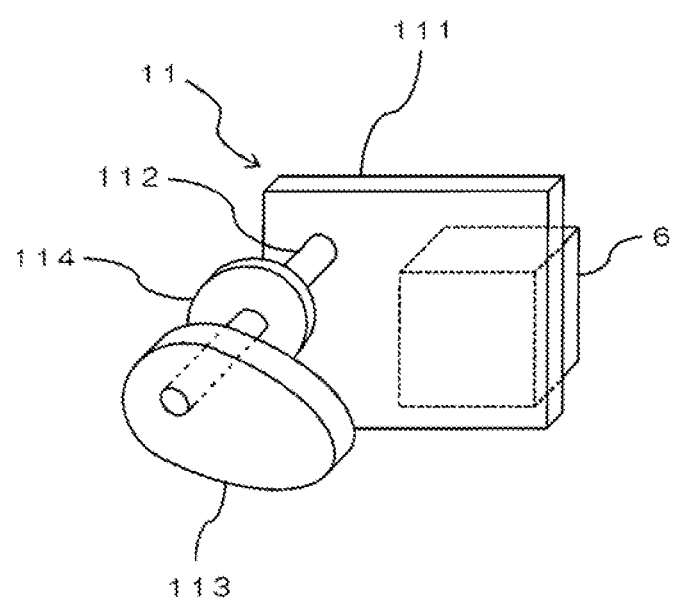
FIG. 2 is a perspective view illustrating a rotation mechanism of the scanning probe microscope of FIG. 1.

FIG. 2 is a perspective view illustrating the rotation mechanism 11.

The rotation mechanism 11 is a mechanism for moving the beam splitter 6 in the housing 2 by rotating and moving the beam splitter 6, and includes a holding portion 111, a shaft portion 112, an operating portion 113, and a locking portion 114.

The holding portion 111 is formed in a plate shape. The beam splitter 6 is fixed to one end surface of the holding portion 111. That is, the holding portion 111 holds the beam splitter 6.

The shaft portion 112 extends from the other end surface of the holding portion 111 toward the other side. The shaft portion 112 is formed in a cylindrical shape extending in a direction orthogonal to the other end surface of the holding portion 111. One end portion of the shaft portion 112 is fixed (connected) to the holding portion 111 by, for example, adhesion. When viewed in the orthogonal direction, the shaft portion 112 is disposed at a position that does not overlap the center of the beam splitter 6. In this manner, the shaft portion 112 is connected to the holding portion 111 so that its extension line is eccentric with respect to the center of the beam splitter 6.

The operating portion 113 is fixed (connected) to the other end portion of the shaft portion 112. The operating portion 113 is formed in a plate shape having an elliptical shape in a side view. The operating portion 113 has a shaft portion 112 fixed to one end portion in the long axis direction thereof.

The locking portion 114 is fixed to the central portion of the shaft portion 112. The locking portion 114 is formed in a plate shape having a circular shape in a side view. The central portion of the locking portion 114 is fixed to the shaft portion 112.

In this way, the rotation mechanism 11 includes the holding portion 111, the shaft portion 112, the operating portion 113, and the locking portion 114 integrally formed.

3. Operation of Rotation Mechanism and Beam Splitter

Figure 3:
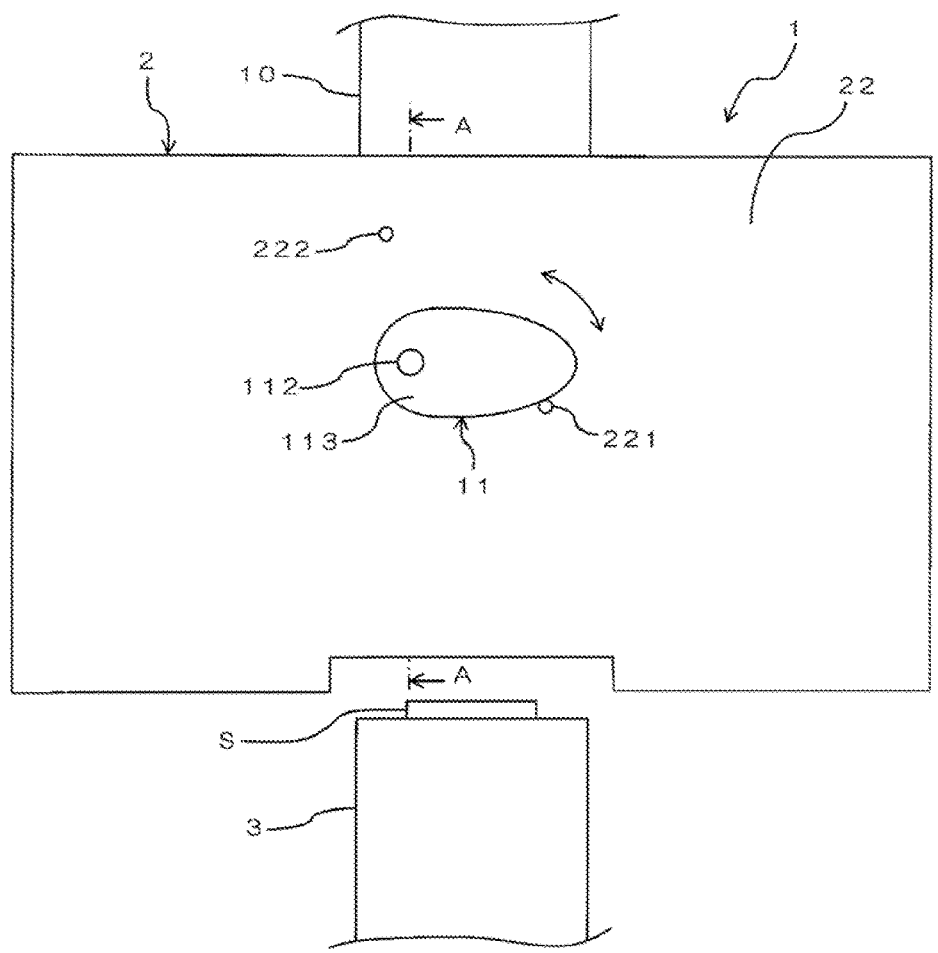
FIG. 3 is a side view illustrating the scanning probe microscope of FIG. 1.
Figure 4:
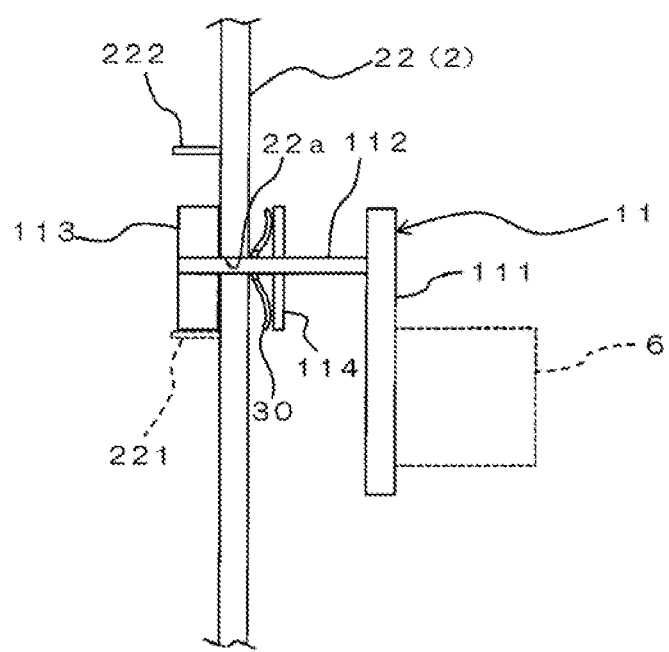
FIG. 4 is a cross-sectional view taken along a line A-A of FIG. 3.

FIG. 3 is a side view illustrating the scanning probe microscope 1. FIG. 4 is a cross-sectional view taken along a line A-A of FIG. 3.

On the side surface 22 of the housing 2 of the scanning probe microscope 1, a first regulating pin 221 and a second regulating pin 222 are provided.

The first regulating pin 221 is formed in a rod shape and extends outward (in a direction orthogonal to the side surface 22 and outward from the housing 2) from the side surface 22. As illustrated in FIG. 4, an insertion hole 22a is formed on the side surface 22. The first regulating pins 221 are disposed at intervals in the horizontal direction with respect to the insertion holes 22a.

As illustrated in FIGS. 3 and 4, the second regulating pin 222 is formed in a rod shape and extends outward (in a direction orthogonal to the side surface 22 and outward, from the housing 2) from the side surface 22. The second regulating pins 222 are disposed above the insertion hole 22a at intervals. The second regulating pins 222 and the first regulating pins 221 are an example of a stopper.

The aforementioned rotation mechanism 11 is attached to the side surface 22 of the housing 2. Specifically, as illustrated in FIG. 4, the shaft portion 112 of the rotation mechanism 11 is inserted into the insertion hole 22a of the side surface 22 of the housing 2 in a rotatable state. In this state, the operating portion 113 of the rotation mechanism 11 is disposed outside the housing 2 (the side surface 22), and the holding portion 111 (the holding portion 111 and the beam splitter 6) of the rotation mechanism 11 and the locking portion 114 are disposed inside the housing 2 (the side surface 22). The operating portion 113 is disposed to be adjacent to the side surface 22. The locking portion 114 is disposed at an interval from the side surface 22. An elastic member 30 is provided between the locking portion 114 and the side surface 22.

The elastic member 30 is, for example, a leaf spring (wave washer) having a cross-sectional shape curved in a wavy shape, and the shaft portion 112 is inserted through a center portion thereof. The elastic member 30 is interposed between the locking portion 114 and the side surface 22 in a compressed state. As a result, an urging force directed toward the direction (inward) away from the side surface 22 is applied to the rotation mechanism 11.

When checking the positions of the sample S and the cantilever 4 in the scanning probe microscope 1, using the optical microscope 10, the user grips and rotates the operating portion 113 from the state illustrated in FIG. 3. In this example, the user rotates the operating portion 113 counterclockwise in a side view toward the second regulating pin 222 side to bring the operating portion 113 into contact with the second regulating pin 222.

As a result, the shaft portion 112 and the holding portion 111 rotate together with the operating portion 113. Further, the beam splitter 6 held by the holding portion 111 rotates and moves. In this way, since the extension line of the shaft portion 112 is eccentric with respect to the center of the beam splitter 6, the beam splitter 6 rotates and moves largely and is disposed at the retracted position C (see FIG. 1).

At this time, since the operating portion 113 abuts against the second regulating pin 222, further movement (rotation) of the operating portion 113 is regulated. The state in which the beam splitter 6 is disposed at the retracted position C is maintained by the urging force applied from the elastic member 30 to the rotation mechanism 11.

Further, from this state, when the observation of the sample S is started in the scanning probe microscope 1, the user grips the operating portion 113 to rotate the operating portion 113 in the direction opposite to the aforementioned direction. In this example, the user rotates the operating portion 113 clockwise in a side view toward the first regulating pin 221 side, and makes the operating portion 113 abut against the first regulating pin 221 as illustrated in FIG. 3.

As a result, the shaft portion 112 and the holding portion 111 rotate together with the operating portion 113. Further, the beam splitter 6 held by the holding portion 111 rotates and moves, and the beam splitter 6 is disposed at the insertion position B (see FIG. 1).

At this time, since the operating portion 113 abuts against the first regulating pin 221, further movement (rotation) of the operating portion 113 is regulated. Further, the state in which the beam splitter 6 is disposed at the insertion position B is maintained by the urging force applied from the elastic member 30 to the rotation mechanism 11.

Further, rattling of the operating portion 113 (rotation mechanism 11) is prevented by the urging force applied from the elastic member 30 to the rotation mechanism 11. Further, when no force is applied to the operating portion 113, such as when the user releases the gripping state of the operating portion 113, the operating portion 113 (the rotation mechanism 11) does not rotate and move, and is disposed to be fixed at an arbitrary position by the urging force of the elastic member 30.

In this way, in the scanning probe microscope 1, when the user grips and rotates the operating portion 113, the holding portion 111 rotates and moves via the shaft portion 112. As a result, the beam splitter 6 held by the holding portion 111 rotates and moves between the insertion position B and the retracted position C in the housing 2.

4. Operational Effect (1) In the present embodiment, as illustrated in FIG. 1, when checking the positions of the sample S and the cantilever 4 in the scanning probe microscope 1 using the optical microscope 10, by disposing the optical microscope 10 to face the first opening portion 21a of the top surface 21 of the housing 2, and by gripping and rotating the operating portion 113 provided on the side surface 22 of the housing 2, the user rotates and moves the shaft portion 112 and the holding portion 111. Further, the beam splitter 6 held by the holding portion 111 is rotated and moved in the housing 2, and is retracted from the field of view of the optical microscope 10.

Therefore, even, when the beam splitter 6 is moved, the beam splitter 6 can always be disposed in the housing 2, and the user can be prevented from touching the beam splitter 6.

As a result, it is possible to prevent the beam splitter 6 from being damaged or stains from adhering to the beam splitter 6.

Further, since the beam splitter 6 moves by rotational movement, the moving distance can be shortened.

Therefore, it is possible to suppress the occurrence of a deviation in the position of the beam splitter 6.

As described above, according to the scanning probe microscope 1, observation can be performed with high accuracy even when the beam splitter 6 is movable.

(2) Further, in the embodiment, as illustrated in FIG. 2, the rotation mechanism 11 includes the holding portion 111 that holds the beam splitter 6, and the shaft portion 112 connected to the holding portion 111. Further, since the shaft portion 112 rotates on the basis of the operation of the operating portion 113 by the user, the holding portion 111 connected to the shaft portion 112 rotates and moves together with the beam splitter 6.

With such a configuration, it is possible to stably rotate and move the beam splitter 6 connected to the operating portion 113 via the shaft portion 112, on the basis of the operation of the operating portion 113 by the user.

(3) Further, in the embodiment, as illustrated in FIG. 2, the shaft portion 112 is connected to the holding portion 111 so that its extension line is eccentric with respect to the center of the beam splitter 6.

Therefore, when the shaft portion 112 rotates on the basis of the operation of the operating portion 113 by the user, the beam splitter 6 rotates and moves largely.

As a result, the operation of the operating portion 113 (the rotational operation of the operating portion 113) performed by the user to move the beam splitter 6 can be set to a small motion.

(4) In the embodiment, as illustrated in FIG. 4, the elastic member 30 is provided between the locking portion 114 and the side surf ace 22. Since an urging force directed in a direction away from the side surface 22 is applied to the rotation mechanism 11 by the elastic member 30, rattling of the rotation mechanism 11 is prevented.

Therefore, it is possible to suppress the occurrence of deviation in the position of the beam splitter 6 due to rattling of the rotation mechanism 11.

(5) Further, in the embodiment, as illustrated in FIG. 3, the first regulating pin 221 and the second regulating pin 222 are provided on the side surface 22 of the housing 2 of the scanning probe microscope 1. In a state in which the beam splitter 6 is disposed at the insertion position B, the operating portion 113 abuts against the first regulating pin 221, and its rotational movement is regulated. In a state in which the beam splitter 6 is disposed at the retracted position C, the operating portion 113 abuts against the second regulating pin 222, and its rotational movement is regulated.

Therefore, by regulating the rotational movement of the operating portion 113 using the first regulating pin 221 and the second regulating pin 222, the beam splitter 6 can be reliably disposed at the insertion position B or the retracted position C.

5. Modified Example

In the above embodiment, the stage 3 having a piezoelectric element is used as a mechanism for relatively moving the cantilever 4 with respect to the surface of the sample S. However, the mechanism for relatively moving the cantilever 4 with respect to the surface of the sample S is not limited to the piezoelectric element, and it is possible to change the position of the stage 3 with respect to the cantilever 4, using any other mechanism. Further, a mechanism may be adopted which relatively moves the cantilever 4 with respect to the surface of the sample S, by changing the position of the cantilever 4 with respect to the stage 3, rather than changing the position of the stage 3 with respect to the cantilever 4.

Further, in the above embodiment, the configuration in which the invention is applied to the atomic force microscope, which is an example of the scanning probe microscope, has been described. However, the invention is also applicable to other scanning probe microscopes such as a scanning tunneling microscope (STM), without being limited to the atomic force microscope.

Further, in the above embodiment, the elastic member 30 is described as a wave washer. However, the elastic member 30 is not limited to a wave washer, the elastic member 30 may be a leaf spring having another shape, or may be other elastic members such as a coil spring or rubber.

Further, in the above embodiment, the elastic member 30 is described as being disposed between the locking portion 114 and the side surface 22. However, the elastic member 30 may be disposed between the operating portion 113 and the side surface 22.

Further, in the above embodiment, the operating portion 113 is described, to have a plate shape having an elliptical shape in a side view. However, the operating portion 113 may have other shapes, for example, a rod shape or a conical shape.

Further, in the above embodiment, the stopper for regulating the rotational movement of the operating portion 113 is described as the first regulating pin 221 and the second regulating pin 222. However, the stopper for regulating the rotational movement of the operating portion 113 may have a convex shape protruding from the side surface 22, and is not limited to a rod-shaped pin. For example, the stopper for regulating the rotational movement of the operating portion 113 may be a plate-like member protruding from the side surface 22.

What is claimed is:

1. A scanning probe microscope comprising:
   a cantilever scanned along a surface of a sample;
   a beam source which irradiates the cantilever with beam;
   a beam receiving unit which receives reflected beam from the cantilever;
   a beam splitter provided on an optical path from the beam source to the beam receiving unit to reflect beam passing through the optical path;
   a housing which houses at least the cantilever and the beam splitter therein; and
   a rotation mechanism which retracts the beam splitter from the optical path inside the housing by rotationally moving the beam splitter,
   wherein an opening portion is formed on a top surface of the housing, an optical microscope for observing the surface of the sample being disposed to face the opening portion,
   the beam splitter is disposed within the field of view of the optical microscope when located on the optical path, and retracts from the field of view of the optical microscope by being rotationally moved by the rotation mechanism to retract from the optical path, and
   the rotation mechanism includes an operating portion which is provided on a side surface other than the top surface of the housing, and is gripped by a user when rotationally moving the beam splitter.

2. The scanning probe microscope according to claim 1, wherein the rotation mechanism includes a holding portion which holds the beam splitter, and a shaft portion connected to the holding portion, and
   the holding portion connected to the shaft portion rotates and moves together with the beam splitter by rotation of the shaft portion based on operation of the operating portion.

3. The scanning probe microscope according to claim 2, wherein the shaft portion is connected to the holding portion such that an extension line thereof is eccentric to the center of the beam splitter.

4. The scanning probe microscope according to claim 1, wherein an elastic member for preventing rattling of the rotation mechanism is provided between the rotation mechanism and the side surface.

5. The scanning probe microscope according to claim 1, further comprising:
   a stopper which regulates a rotational position of the operating portion at each of an insertion position at which the beam splitter is located on the optical path and a retracted position at which the beam splitter is retracted from the optical path.

* * * * *